United States Patent [19]

Reisberg et al.

[11] Patent Number: 4,493,371
[45] Date of Patent: Jan. 15, 1985

[54] RECOVERING OIL BY INJECTING AQUEOUS ALKALI, COSURFACTANT AND GAS

[75] Inventors: Joseph Reisberg, Houston; Lawrence J. Bielamowicz, Bellaire; David R. Thigpen, Houston, all of Tex.

[73] Assignee: Shell Oil Company, Houston, Tex.

[21] Appl. No.: 518,711

[22] Filed: Jul. 29, 1983

[51] Int. Cl.³ .............................................. E21B 43/22
[52] U.S. Cl. ..................... 166/274; 166/275; 252/8.55 D
[58] Field of Search ........... 166/273, 274, 275, 305 R; 252/8.55 D

[56] References Cited

U.S. PATENT DOCUMENTS

| | | | |
|---|---|---|---|
| 3,386,506 | 6/1968 | Quance | 166/273 |
| 3,387,655 | 6/1968 | Hurd | 166/273 X |
| 3,927,716 | 12/1975 | Burdyn et al. | 166/274 X |
| 3,929,190 | 12/1975 | Chang et al. | 166/273 X |
| 4,004,638 | 1/1977 | Burdyn et al. | 166/273 |
| 4,044,831 | 8/1977 | Allen | 166/275 |
| 4,110,224 | 8/1978 | Allen | 166/275 X |

Primary Examiner—George A. Suchfield

[57] ABSTRACT

A process of recovering oil from a subterranean reservoir in which the oil is acidic but forms monovalent cation soaps of only relatively low interfacial activity when reacted with aqueous alkaline solutions, comprises displacing the oil toward a production location with a mixture of gas and cosurfactant-containing aqueous alkaline solution.

6 Claims, 1 Drawing Figure

RECOVERING OIL BY INJECTING AQUEOUS ALKALI, COSURFACTANT AND GAS

CROSS REFERENCE TO RELATED APPLICATION

In general, the present invention amounts to modification of the process described in the commonly assigned patent application on "Recovering Oil By A Caustic Gas-Liquid Drive Process", Ser. No. 369,449 (now abandoned) filed Apr. 19, 1982 by Joseph Reisberg and Lawrence James Bielamowicz.

BACKGROUND OF THE INVENTION

The present invention relates to recovering oil from subterranean oil reservoirs in which the reservoir oil contains petroleum acids which form surface-active soaps when reacted with an aqueous alkali. More particularly, the present invention relates to recovering oil from such a reservoir in which the soaps formed from the reservoir oil have only a relatively low extent of interfacial activity.

Numerous patents and journal articles relate to alkaline water-flooding processes ("caustic floods") in which alkaline aqueous fluids are injected into reservoirs to displace oil toward production locations. For example, U.S. Pat. No. 3,927,716 describes such a process in which the aqueous alkaline solution has a pH from about 11.5 to 13 and a relatively low monovalent salt concentration (from about 0.5 to 2.0 weight percent) and indicates that such proportions increase the oil displacing efficiency. U.S. Pat. No. 4,004,638 describes an alkaline water flooding process in which a slug of aqueous alkali is followed by a slug of aqueous alkali containing an organic sulfonate surfactant and indicates that such a procedure provides greater oil recovery. U.S. Pat. No. 4,081,029 describes an alkaline water flooding process using an alkali metal silicate solution and indicates that it is particularly advantageous where the oil is relatively viscous and/or the reservoir contains zones of significantly different permeability.

Such caustic flood oil recovery processes are complicated by the fact that as an aqueous alkali is flowing through a reservoir it tends to be consumed by physical or chemical interactions other than the desired conversion of petroleum acids to surfactant soaps. Many reservoirs contain multivalent cations dissolved in the reservoir water and/or adsorbed by cation exchange on clays, and such cations tend to react with and consume the caustic. In addition, some reservoirs contain silica compounds which react with and consume an aqueous hydroxide. Unless the caustic concentration in the injected solution is relatively high, most of the caustic is consumed before the solution flows through much of the reservoir.

Thus, the prior art teachings and beliefs indicate a problem. Although it is known that a low caustic concentration (generally, equivalent to about 0.2% by weight of sodium hydroxide) is desirable to cause the surfactant system containing the petroleum acid soaps formed by the caustic to have a low interfacial tension against the oil, a much higher caustic concentration (in the order of 1% by weight of sodium hydroxide) is needed to cause enough of the caustic to be effectively propagated through the reservoir. When a relatively concentrated alkaline solution is injected, the chemical costs are significantly increased, since more alkaline material is required and (due to the reduced efficiency) more solution is required. In addition, water-thickening chemicals may be needed to reduce the mobility of the alkaline solution. In general, the water-thickeners employed to provide a relatively low mobility aqueous solution suitable for an oil recovery process are polymers, such as the partially hydrolyzed polyacrylamides or polysaccharides such as the xanthan gum polymers. In addition to increasing the cost, the use of such polymers may introduce a chemical instability, due to its interactions with the alkaline solution and/or reservoir fluid. The rate and extent to which the polymers react with an aqueous alkali is known to increase with increases in the alkali concentration and temperature and such reactions may become significant at the temperature and pressure of the reservoir.

U.S. Pat. Nos. 3,653,440 and 4,203,491 by Joseph Reisberg describe oil recovery processes using slugs of preformed aqueous surfactant systems (which are effective or "active" in respect to reducing the interfacial tension between the surfactant system and the reservoir oil) displaced with a drive fluid comprising a substantially homogeneous mixture of aqueous liquid and gas, rather than an aqueous liquid containing a water-thickening polymer. In both of those patents, it is indicated that little or no oil-displacing effects were exhibited when such drive fluid dispersions (or foams) of gas and water were injected without the preceding slug of active surfactant.

The Ser. No. 369,449 patent application describes a process which is particulary effective for recovering oil from a reservoir in which the oil reacts with an injected aqueous alkali to yield soaps having a significant extent of interfacial activity which activity is optimum in the presence of relatively low concentrations of dissolved alkaline material. In that process the reservoir oil is displaced toward a production location by injecting an oil displacing mixture of gas and aqueous alkaline solution in which the proportions of dissolved alkaline material and neutral salt are arranged for substantially optimizing the activity of the surfactant system formed by the reaction with the reservoir oil. The disclosures of the Ser. No. 369,449 patent application are incorporated herein by reference.

SUMMARY OF THE INVENTION

The present invention relates to recovering oil from a subterranean reservoir containing an oil which forms monovalent cation soaps having only a relatively low interfacial activity which is substantially the same within aqueous systems containing relatively widely varying proportions of alkali or alkali and other electrolytes (which proportions are inclusive of those most optimum for interfacial activity). The oil-displacing fluid injected in accordance with the present invention comprises a mixture of gaseous fluid (which remains gaseous within the reservoir) and an aqueous alkaline solution which contains both a cosurfactant (which is water-soluble and in the presence of electrolytes significantly miscible with the reservoir oil) and enough dissolved alkaline material and substantially neutral salt to cause a stoichiometric excess of alkaline material to contact the oil. The oil is recovered from the fluid displaced into a production location in the reservoir.

DESCRIPTION OF THE DRAWING

The drawing illustrates graphs of oil saturations with amounts of different fluids displaced through earth formation cores which initially contained an acidic crude oil in a water residual oil saturation.

DESCRIPTION OF THE INVENTION

Figure 1:
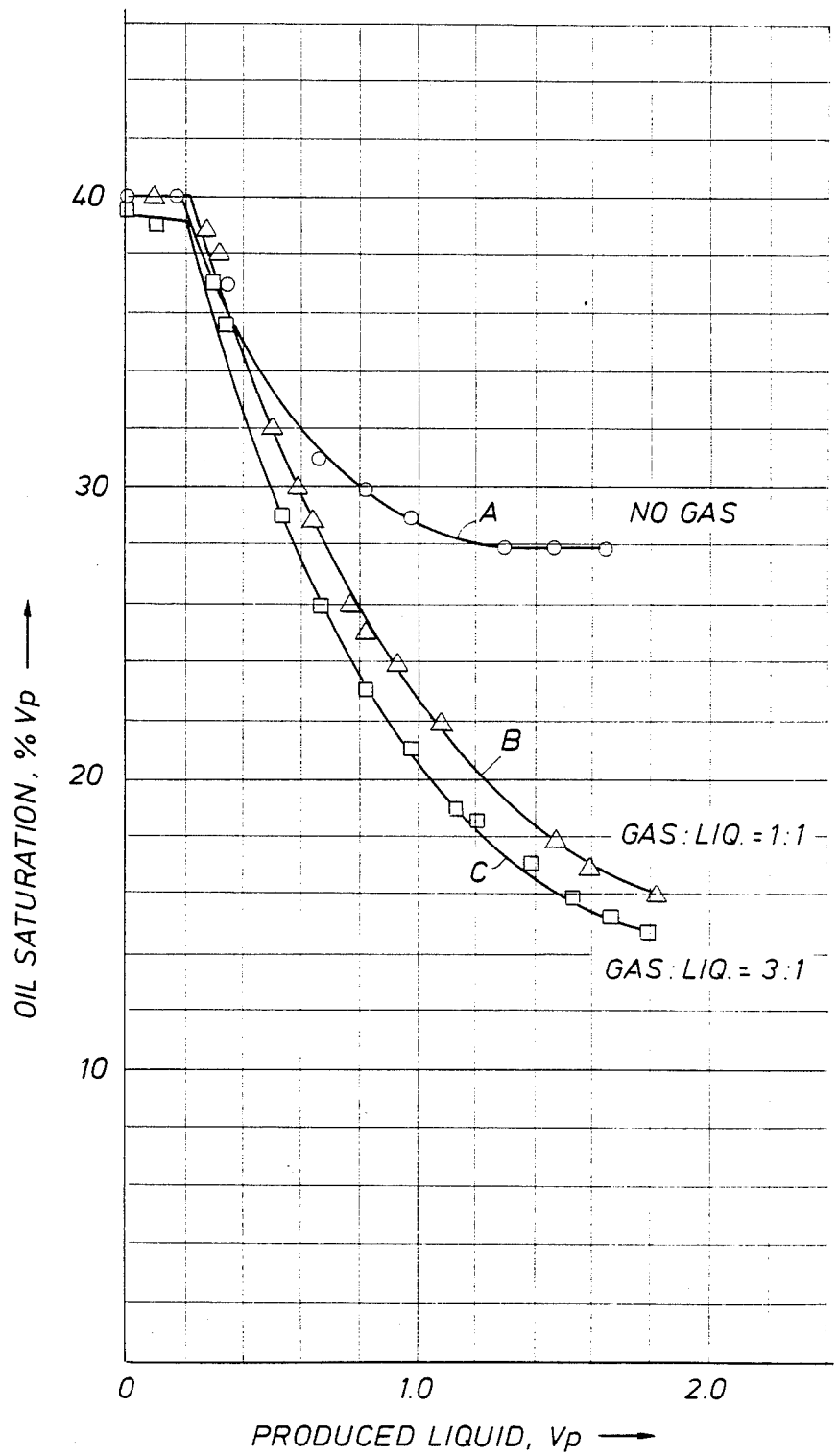

The present invention is, at least in part, premised on a discovery by the applicants that, with respect to oils of the presently specified type, an inclusion of a cosurfactant within an aqueous alkaline liquid component of an oil displacing mixture of liquid and gas provides a beneficial synergistic result. When no cosurfactant is included, even when the total electrolyte content of an aqueous alkali solution is optimum, the interfacial activity of the surfactant system formed by the reaction with the reservoir oil is too low to provide an effective displacement of the oil. In contrast, when the cosurfactant is included, it causes both an increase in the interfacial activity of the soaps formed from the reservoir oil and a significant increase in the salinity tolerance of the surfactant system which is formed in situ. Unobviously, the amount of cosurfactant needed to accomplish such benefits is only a relatively small and economically feasible amount, which is generally less than about 1 percent of the weight of aqueous liquid in the injected alkaline solution.

Oil displacement experiments were performed at 73° C. in 200–300 md Berea cores using dilute aqueous caustic and caustic-nitrogen gas combinations (free of an cosurfactant) as the displacing media. The gas and liquid wee injected simultaneously, each at a rate of 1 ft/day. Cores were oriented horizontally. The results are shown in Table 1 as percent of residual waterflood oil displaced. The initial residual oil saturations to aqueous 1 percent NaCl solutions were 40% ±1.

TABLE 1

| Oil Recovery (% of $S_{or}$) after Production of One Vp of Liquid | | |
|---|---|---|
| NaOH (%) | Without Gas | With Gas |
| 0.05 | 3 | 21 |
| 0.20 | 3 | 17 |
| 0.40 | 2 | 20 |

It is clear from the data in Table 1 that the aqueous alkaline solutions which were free of cosurfactant were ineffective for displacing the oil being tested, even during a simultaneous injection of gas and aqueous liquid. The oil being tested was a relatively light Gulf Coast oil which, when reacted with aqueous alkaline solutions of various total electrolyte contents, produced surfactants systems having only relatively low interfacial activity. For example, in the "emulsion screening test" (which is subsequently described in greater detail) the oil being tested formed only relatively weak emulsions compared to those which are typically formed by heavy acidic crude oils. And, to the extent there was an optimum concentration of electrolyte, it was not sharply defined. Emulsions of similar appearance and strength were obtained in water solutions containing proportions of sodium hydroxide ranging from about 0.05 to 0.4 percent by weight of the water.

Results of several oil-displacement experiments in 10-inch long Berea cores are shown in FIG. 1. Before the tested displacements were initiated, the cores each contained the same relatively light Gulf Coast oil at a residual oil saturation of about 40% of the core pore volume relative to waterflooding with aqueous 4.75% sodium chloride. In the displacement experiments, the liquid components of the oil-displacing fluids which were injected each consisted of water solutions of 1% NaOH, 3.28% NaCl and 0.20% Neodol 25-3S cosurfactant. The gas used was nitrogen.

Curve A shows the oil recovery trace for the alkaline solution without gas. About 30% of the residual oil was recovered. Curve B shows the effect of alternate injections of 10% Vp slugs of the alkaline solution and nitrogen. The final oil saturation was 16% —doubling the recovery obtained in the absence of gas. In another run (curve C) the gas/aqueous phase ratio was increased to a value of three with the liquid flowing at 1 ft/day and the gas at 3 ft/day. Additional oil was recovered but the improvement in oil displacement over that shown in curve B was marginal.

The displacements shown in FIG. 1 were performed in a vertical, gravity stable condition —that is, with gas flow downward. An experiment with alternate gas-liquid slugs (as in curve B) was performed in a gravity unstable condition (gas flow upward). Results were identical to those shown in curve B. A comparable experiment performed with a horizontally mounted core, yielded about 4 percent less oil than did the system shown in Curve B.

In such oil-displacement experiments, the pressure drops across the cores tend to oscillate, rising during liquid injection, falling with gas injection, but maintaining an upward trend. The peak increases are about 10 psi and are obtained after about 2 pore volumes of liquid production. Most of the oil is recovered at pressure drops of 2–5 psi.

In the present process, the function of the aqueous alkaline solution is an in situ formation of an aqueous surfactant system in which the surfactant consists essentially of soaps of petroleum acids, formed at the interface between the injected aqueous liquid and the reservoir oil. An essential criterion for an effective displacement of the oil is the existence of a very low interfacial tension between the surfactant system and the oil. In general, the present process is useful in recovering oil from substantially any subterranean reservoir containing an oil which has an acid number of at least about 0.1 milligrams of potassium hydroxide per gram of oil and forms soaps of relatively low interfacial activity. The process is particularly useful in reservoirs through which an aqueous fluid can be flowed at a suitable rate in response to a relatively low injection pressure.

In the present process, the aqueous liquid used as a solvent for the inorganic alkaline materials and neutral salts, can be substantially any clear aqueous liquid in which the total electrolyte content (inclusive of the concentration of the dissolved inorganic alkaline material and cosurfactant) is at least near optimum for the surfactant system formed in situ from the oil to be recovered. The cosurfactants suitable for use in the present invention can be substantially any surface active material which are soluble in the aqueous alkaline solution and are partially, but not completely, partitioned into the oil when the oil is contacted within the reservoir. Suitable cosurfactants comprise amphiphilic molecules in which the polar groups are sulfates, sulfonates, nitrates, carboxylates, phosphates, phosphonates, etc. The non-polar parts of such amphiphilic molecules can be, but are not restricted to, aliphatic, aromatic or aliphatic-substituted aromatic hydrocarbon groups. Due to the low concentration of multivalent cations which are capable of remaining dissolved in aqueous alkaline solutions, cosurfactants of widely differing chemical structures may be useful. Particularly suitable cosurfactants are typified by polyklkoxyalcohol sulfate surfactants such as NEODOL ® 25-3S (a polyalkoxyalcohol sulfate surfactant available from Shell Chemical Company) and/or a benzenesulfonate analog of the NEODOL ® 25-3S in which the sulfate group is replaced by an ethoxyphenylethersulfonate group. Other suitable cosurfactants include aromatic ether polysulfonates, such as the Dowfax aromatic ether polysulfonate surfactants described in U.S. Pat. No. 3,945,437 by Y. C. Chiu and H. J. Hill, Igepon TC-42 or T-43 (sodium N-methyl-N-alkyl acid taurate, from G.A.F.), Triton X-200 (sodium alkyl aryl polyether sulfonate, from Rohm and Haas), Ethomid HT 15 (ethylene oxide condensates of fatty acid amides, from Armak), Aerosol OT (dialkyl ester of sodium sulfosuccinic acid, from American Cyanamid), Gafac LO-529 (sodium salt of organic phosphate ester, from G.A.F.), Stepanflo (alpha-olefin sulfonate surfactants, from Stepan Chemical Co.), propoxylated ethoxylated nonionic surfactants such as those described in U.S. Pat. No. 4,293,428, amphiphilic coupling agents of the type described in U.S. Pat. No. 3,330,314 by J. Reisberg, etc.

The inorganic alkaline material to be used can comprise substantially any water-soluble alkali metal hydroxide or ammonium hydroxide or alkaline salt, inclusive of such silicates, carbonates, bicarbonates, borates or water-soluble salts of other inorganic weak acids which are capable of providing an alkalinity substantially equalling that of a water solution having a pH of at least about 10.

The substantially neutral inorganic salts which may be dissolved in the caustic solution used in the present process can comprise substantially any water soluble, monovalent inorgainic salts which are stable at the reservoir temperature and are substantially neutral with respect to alkali metal hydroxides. If any multivalent ion salts are present, their concentration should not exceed the solubility of the corresponding multivalent ion hydroxides at the temperature of the reservoir to be treated.

As known to those skilled in the art, an increase in the concentration of an inorganic alkaline material, such as sodium hydroxide, in a water solution increases the total electrolyte concentration of that solution. The amount of substantially neutral inorganic salt which is dissolved in the caustic solution can range from substantially trace amounts to several percent. With respect to a given reservoir oil and temperature, the amount of such neutral salt should decrease with increases in the concentration of inorganic alkaline material. In each case the alkaline solution should include sufficient dissolved inorganic alkaline materials to neutralize at least substantially all of the petroleum acids contained in the oil to be recovered.

Emulsion screening tests and/or microscopic screening tests, core or sand pack oil displacement tests, or the like, can be used to determine or confirm whether the oil in a particular reservoir is one which forms monovalent cation soaps having a relatively low interfacial activity or whether a selected proportion of cosurfactant or inorganic alkaline materials and neutral salts is optimum relative to the oil, water and temperature in the reservoir to be treated. Such tests can be conducted at the reservoir temperature, with samples of the oil and water from the reservoir or with synthetic samples of such fluids or with samples of fluids which are substantially equivalent to the reservoir fluids with respect to the surfactant-soap formation and oil-displacement aspects of the process. The emulsion screening tests comprise preparing tubes containing varying amounts of the inorganic alkaline material and neutral salt mixed with significant proportions of the reservoir oil (e.g. in a volume ratio of 5 to 1). The tubes are then comparably agitated (e.g., by rocking them) at the reservoir temperature. The oils which yield, and the proportions of the caustic and salt which yield the best emulsions (e.g., those most quickly formed and longest lasting) are the most active oils and/or proportions of salt which are nearest to optimum.

The substantially noncondensable gas utilized in the present process can be substantially any which remains relatively inert and is neither significantly condensed nor dissolved at the temperature, pressure and fluid content conditions encountered during the application of the present process to a given oil-containing reservoir. Examples of such gases include nitrogen, air, flue gas, combustion gas and the like.

The fluids consisting of aqueous dispersions or relatively homogeneous mixtures of noncondensable gas in the alkaline aqueous liquids used in accordance with the present process can advantageously contain additives such as corrosion inhibitors, stabilizers, bactericides and the like, such as those conventionally used in chemical flood oil recovery process, as long as such additives are compatible with the dispersions and cosurfactant-containing systems which are injected into, and formed within, the reservoir. In general, such fluids preferably contain volumetric proportions of liquid and gas which are substantially equal at the reservoir temperature and the pressure at which such fluids are injected into the reservoir.

In general, the gas and liquid components of fluids used in the present process are preferably injected simultaneously, as a dispersion of the gas in the liquid, or as a pair of co-flowing streams of the two fluids within a common conduit. However, where desirable, one or more gases and liquids can be injected in the form of alternating small slugs, as long as the mixture of gas and liquid becomes substantially homogeneous near the injection well, e.g., within about 10 feet from the well.

A particular advantage of the present invention is its capability of producing a significant amount of oil from a subterranean reservoir at a chemical and operating expense which is relatively low. Therefore, it is generally preferable to employ few, if any, additives other than the gas, alkaline material, cosurfactant, and salt.

Where the portion of the reservoir into which the present oil-displacing fluid is to be injected does or may contain an aqueous solution of salts of multivalent cations, such a solution is preferably displaced by a preflushing injection of liquid consisting essentially of a water solution of salts of monovalent cations.

What is claimed is:
1. An oil recovery process comprising:
  injecting an oil-displacing fluid inclusive of gas and aqueous alkaline liquid into a subterranean reservoir containing an oil which is significantly acidic but forms monovalent cation soaps of only relatively low interfacial activity when reacted with an aqueous liquid containing a stoichiometric excess of dissolved alkaline material;
  using as said oil-displacing fluid a mixture which, before or soon after entering the reservoir, is sub- stantially homogeneous and contains significant proportions of (a) an aqueous alkaline solution containing kinds and amounts of dissolved inorganic alkaline material, polyalkoxyalcohol sulfate cosurfactant, and substantially neutral salt providing an alkalinity exceeding the stoichiometric requirement for neutralizing substantially all of the acidity of the reservoir oil and a total salinity which is substantially optimum for lowering the interfacial tension between the surfactant system which is formed by reaction with the reservoir oil at the reservoir temperature and (b) a fluid which is gaseous at the temperature and pressure encountered in the reservoir; and recovering oil displaced by the injected fluid.

2. The process of claim 1 in which said cosurfactant is polyalkoxyalcohol sulfate surfactant sold under the trademark NEODOL 25-3S ®.

3. The process of claim 1 in which the inorganic alkaline material is sodium hydroxide and the neutral salt is sodium chloride.

4. The process of claim 1 in which the aqueous alkaline solution and gaseous fluid are injected substantially simultaneously.

5. The process of claim 1 in which the aqueous alkaline solution and gaseous fluid are injected as alternating small slugs.

6. The process of claim 1 in which the water in the portion of the reservoir in which the oil-displacing fluid is injected consists essentially of a water solution of salts of monovalent cations.

* * * * *